United States Patent Office 2,837,539
Patented June 3, 1958

2,837,539

PREGNENE-20-THIONES

Raymond M. Dodson, Park Ridge, and Paul B. Sollman, Skokie, Ill., assignors to G. D. Searle & Co., Chicago, Ill., a corporation of Delaware No Drawing. Application April 20, 1956
Serial No. 579,434

3 Claims. (Cl. 260—397.3)

The present invention relates to steroidal thioketones, and is specifically concerned with 3-oxygenated pregnene-20-thiones wherein there is a nuclear double bond extending from position 5. Compounds of the present invention can be represented by the structural formulas

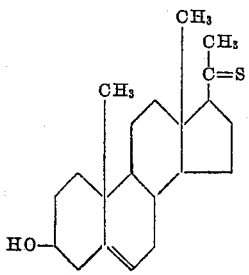

and

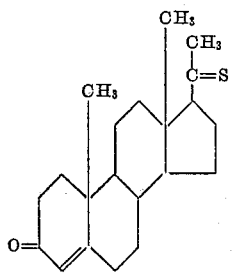

A suitable method of manufacture for compositions of this invention is as follows. A 20-keto-pregnane derivative which is nuclearly-unsaturated is reacted with benzyl mercaptan in order to form the dibenzylmercaptole. This dibenzylmercaptole is treated with an alkali metal in liquid ammonia, and the thioketone is recovered from the reaction mixture. As a specific example, 3β-hydroxy-5-pregnen-20-one (pregnenolone) in benzene solution is treated with benzyl mercaptan in the presence of p-toluenesulfonic acid, and the crude dibenzylmercaptole which results is treated with sodium in liquid ammonia. After dilution of the reaction mixture with ether and ethanol, the mixture is extracted with water, and the base-soluble 3β-hydroxy-5-pregnene-20-thione is recovered as an insoluble precipitate by acidification of the separated aqueous phase. The same 3β-hydroxy-5-pregnene-20-thione is obtained by treating an ester such as 3β-acetoxy-5-pregnen-20-one with benzyl mercaptan and subjecting the resulting dibenzylmercaptole to reaction with sodium in liquid ammonia. By oxidation with a reagent such as aluminum isopropoxide in toluene and cyclohexanone, 3β-hydroxy-5-pregnene-20-thione is converted to 3-oxo-4-pregnene-20-thione. Esters are obtained by treatment of suitable compositions of this invention with an esterifying agent such as an acyl halide or an alkanoic acid anhydride.

By employing as starting materials other 3-hydroxy and 3-acyloxy-20-ketosteroids and subjecting them to the steps of dibenzylmercaptole formation, reaction of the dibenzylmercaptole with sodium in liquid ammonia, and oxidation of the resulting 3-hydroxy-20-thione with aluminum isopropoxide in toluene and cyclohexanone, other steroidal thioketones can be obtained by the procedures described herein. The following are representative transformations which can be carried out by these procedures.

From 3-hydroxy-17α-methyl-5-pregnen-20-one there are obtained 3-hydroxy-17α-methyl-5-pregnene-20-thione and 3-oxo-17α-methyl-4-pregnene-20-thione.

From 3-hydroxy-19-nor-5-pregnen-20-one there are obtained 3-hydroxy-19-nor-5-pregnene-20-thione and 3-oxo-19-nor-4-pregnene-20-thione.

From 3-hydroxy-17α-methyl-19-nor-5-pregnen-20-one there are obtained 3-hydroxy-17α-methyl-19-nor-5-pregnene-20-thione and 3-oxo-17α-methyl-19-nor-4-pregnene-20-thione.

From 3,21-dihydroxy-5-pregnen-20-one there are obtained 3,21-dihydroxy-5-pregnene-20-thione, and its esters and oxidation products.

From 3,17α-dihydroxy-5-pregnen-20-one there are obtained 3,17α-dihydroxy-5-pregnene-20-thione and 3-oxo-17α-hydroxy-4-pregnene-20-thione.

The compounds of this invention are valuable pharmacological agents, and they exhibit hormonal and antihormonal properties which render them useful in hormonal therapy. In many areas of chemical and biological research, organic sulfur compounds have been found to exhibit effects opposed to those of the oxygen analogs to which they are structurally related. In marked contrast, the compounds of the present invention, which can be regarded as sulfur analogs of progesterone, have progestational properties of their own. For example, 3-oxo-4-pregnene-20-thione is an exceptionally potent progestational agent.

This invention will appear more fully from the examples which follow. These examples are set forth by way of illustration only and it will be understood that the invention is not to be construed as limited in spirit or in scope by the details contained therein, as many modifications in materials and methods will be apparent from this disclosure to those skilled in the art. In these examples temperatures are given in degrees centigrade (°C.) and quantities of materials in parts by weight.

Example 1

A mixture of 20 parts of 3β-hydroxy-5-pregnen-20-one, 18.5 parts of benzyl mercaptan, 1 part of p-toluenesulfonic acid and 220 parts of benzene is heated under reflux for about 7 hours. The water formed in the reaction is continuously removed by means of a water separator through which the condensate is returned to the reaction vessel. The mixture is extracted with 10% sodium hydroxide solution, after which the benzene phase is washed with water and concentrated to dryness. The oily residue deposited by evaporation of the benzene solution is the crude dibenzylmercaptole of 3β-hydroxy-5-pregnen-20-one of the structural formula

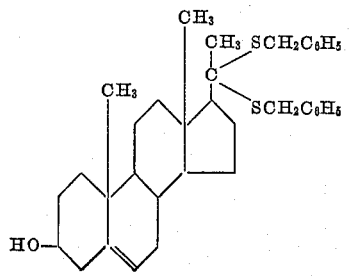

Example 2

To a solution of 22 parts of sodium in 370 parts of liquid ammonia there is added 18.2 parts of the crude dibenzylmercaptole of 3β-hydroxy-5-pregnen-20-one. The mixture is stirred for 4 hours, during which time there is added a total of 570 parts of anhydrous ether in several portions. There is then cautiously added a total of 140 parts of anhydrous ethanol during a period of 1 hour, followed by an additional 250 parts of anhydrous ether and an additional 80 parts of anhydrous ethanol, added alternately and in portions over a period of 1 hour. Stirring is continued throughout the foregoing operations. The mixture is allowed to stand for several hours and is then poured into 1000 parts of water. The aqueous phase is separated, combined with a water extract of the organic solvent phase, and the combined aqueous solution is treated with ice and with 105 parts of acetic acid in order to precipitate the desired product. The insoluble product is collected and dissolved in a mixture of benzene and ethyl acetate, and the solution is concentrated to yield a residual orange oil. A solution of this oil in a minimum quantity of benzene is poured on a chromatography column prepared from 150 parts of silica. After the column is washed with a small amount of benzene, the desired compound is obtained as a pink oil by elution with a five volume percent solution of ethyl acetate in benzene. Crystallization of this product from petroleum ether yields 3β-hydroxy-5-pregnene-20-thione which undergoes a transition point with fusion at about 90–91° C., resolidifies, and finally melts at about 113–115° C. This compound has the structural formula

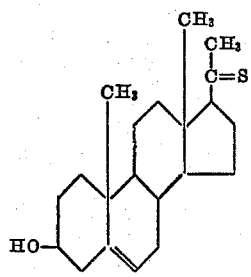

Example 3

A solution of aluminum isopropoxide is prepared by stirring 8 parts of this compound with 36 parts of toluene, and by decanting from a small amount of insoluble residue. A reaction mixture prepared from this solution of aluminum isopropoxide, 10 parts of 3β-hydroxy-5-pregnene-20-thione, 350 parts of toluene and 57 parts of cyclohexanone is heated under reflux for 20 minutes. The cooled mixture is diluted with 440 parts of benzene and extracted with a solution of 150 parts of sodium potassium tartrate in 1000 parts of water. It is advantageous to conduct this extraction with separate portions of the aqueous solution. The organic solvent phase is then washed with water and concentrated to dryness. The reddish, oily residue is extracted with 650 parts of petroleum ether. A small amount of insoluble material is separated and discarded, and the solution is concentrated to dryness. The residue which results from this operation is extracted with 350 parts of petroleum ether.

A small amount of insoluble residue is again separated and discarded. Upon concentration of the solution a crystalline reaction product can be obtained, but in order to obtain the maximum yield the solution is distilled to dryness and the oily residue dissolved in a minimum quantity of benzene is poured on a chromatography column prepared from 200 parts of silica. After the column is washed with benzene and with a small amount of a five volume percent solution of ethyl acetate in benzene, subsequent elution of the column with a five volume percent solution of ethyl acetate in benzene affords the reaction product as a pink oil which crystallizes from petroleum ether. Further purification by recrystallization from a mixture of ether and petroleum ether yields 3-oxo-4-pregnene-20-thione melting at about 145° C. This compound has the structural formula

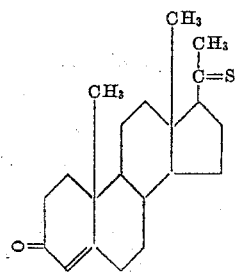

What is claimed is:

1. A member of the group consisting of 3-oxo-4-pregnene-20-thione and 3-hydroxy-5-pregnene-20-thione.

2. A compound of the structural formula

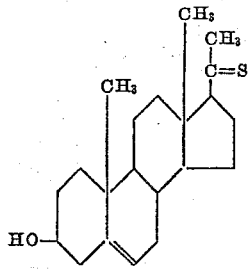

3. A compound of the structural formula

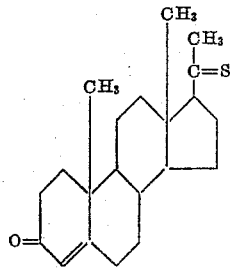

References Cited in the file of this patent

UNITED STATES PATENTS

| | | |
|---|---|---|
| 2,333,202 | Ruzicka et al. | Nov. 2, 1943 |
| 2,363,338 | Koster | Nov. 21, 1944 |
| 2,598,654 | Wettstein et al. | May 27, 1952 |
| 2,609,378 | Rosenkranz | Sept. 2, 1952 |
| 2,697,108 | Rosenkranz et al. | Dec. 14, 1954 |